United States Patent [19]

Sasaki et al.

[11] Patent Number: 4,910,605

[45] Date of Patent: Mar. 20, 1990

[54] VIDEO SIGNAL RECORDING METHOD AND APPARATUS FOR FIELD-SEGMENT RECORDING

[75] Inventors: Seishi Sasaki, Kobe; Mitsuo Chiba, Osaka; Tatsushi Bannai, Osaka; Shigeru Awamoto, Osaka, all of Japan

[73] Assignee: Matsushita Electric Industrial Co., Ltd., Osaka, Japan

[21] Appl. No.: 344,513

[22] Filed: Apr. 26, 1989

Related U.S. Application Data

[63] Continuation of Ser. No. 15,355, Feb. 17, 1987, abandoned.

[30] Foreign Application Priority Data

| Feb. 18, 1986 | [JP] | Japan | 61-34593 |
| Feb. 25, 1986 | [JP] | Japan | 61-39915 |
| Feb. 28, 1986 | [JP] | Japan | 61-44413 |
| Mar. 20, 1986 | [JP] | Japan | 61-62295 |

[51] Int. Cl.$^4$ .......................................... H04N 9/79
[52] U.S. Cl. .................................. 358/310; 358/312; 358/328; 360/10.3
[58] Field of Search ............ 358/310, 312, 313, 327, 358/328, 335; 360/33.1, 9.1, 10.3, 11.1, 22, 32, 35.1, 38.1, 64

[56] References Cited

U.S. PATENT DOCUMENTS

| 2,892,015 | 6/1959 | Jones | 358/15 |
| 4,084,181 | 4/1978 | Mita et al. | |
| 4,139,867 | 2/1979 | Foerster | 360/10.3 |
| 4,168,509 | 9/1979 | Hartmann | 358/83 |
| 4,183,067 | 1/1980 | Kihara et al. | 360/33.1 |
| 4,293,879 | 10/1981 | Heitmann et al. | 360/10.3 |
| 4,339,775 | 7/1982 | Lemke et al. | 360/10.3 |
| 4,355,324 | 10/1982 | Reitmeier | 358/312 |
| 4,389,668 | 6/1983 | Favreau | 358/83 |
| 4,393,414 | 7/1983 | Reitmeier | 360/38.1 |
| 4,395,738 | 7/1983 | Hedlund et al. | 360/9.1 |
| 4,429,334 | 1/1984 | Hashimoto et al. | 358/310 |
| 4,463,387 | 7/1984 | Hashimoto et al. | 358/310 |
| 4,472,745 | 9/1984 | Foerster et al. | 358/310 |
| 4,484,236 | 11/1984 | Wilkinson | 360/10.3 |
| 4,549,227 | 10/1985 | Hashimoto et al. | 358/310 |
| 4,563,710 | 1/1986 | Baldwin | 360/9.1 |
| 4,574,300 | 3/1986 | Hulyer | 358/12 |
| 4,597,020 | 6/1986 | Wilkinson | 360/33.1 |
| 4,608,609 | 8/1986 | Takano et al. | 358/310 |
| 4,611,250 | 9/1986 | Yoshinaka et al. | 360/9.1 |
| 4,614,980 | 12/1986 | Ninomiya et al. | 360/9.1 |
| 4,630,131 | 12/1986 | Ichinoi et al. | 358/310 |
| 4,633,293 | 12/1986 | Powers | 358/140 |
| 4,641,201 | 2/1987 | Ichinoi et al. | 358/310 |
| 4,660,096 | 4/1987 | Arlen et al. | 360/35.1 |
| 4,672,434 | 6/1987 | Suzuki et al. | 358/152 |
| 4,677,464 | 6/1987 | Yamaji et al. | 358/312 |
| 4,685,002 | 8/1987 | Powers | 358/152 |
| 4,719,519 | 1/1988 | Ide et al. | 358/310 |
| 4,736,246 | 4/1988 | Nishikawa | 358/92 |
| 4,743,965 | 5/1988 | Yamada et al. | 358/92 |

FOREIGN PATENT DOCUMENTS

0120698 10/1984 European Pat. Off. .
0168834 1/1986 European Pat. Off. .

OTHER PUBLICATIONS

Dill, "High Resolution NTSC Television System", IBM Tech. Disc. Bul., vol. 21, No. 5, Oct. 1978, pp. 2148–2153.
BRITISH KINEMATOGRAPHY SOUND AND TELEVISION SOCIETY JOURNAL, No. 8, pp. 476–479, Aug. 1985, London, GB; S. Lowe: "The Arrival of Components" * p. 478, column 1, lines 30–49, FIG. 4; p. 479, column 1, lines 3–21, FIG. 7 *.

Primary Examiner—Donald McElheny, Jr.
Attorney, Agent, or Firm—Lowe, Price, Leblanc, Becker & Shur

[57] ABSTRACT

A video signal recording method and apparatus for recording each field of a video signal as a plurality of segments on respective tracks of a magnetic tape, in which each segment consists of a sequentially-ordered set of scanning lines which constitute a fraction of the total scanning lines of the field and which extend substantially over the entire field, for example all of the even-numbered or all of the odd-numbered lines of the field. Since each recording track contains scanning lines extending sequentially over one field, a playback signal providing a correctly ordered display image is obtained for playback operation at speeds higher or lower than the standard speed, while utilizing the same recording and playback signal processing circuits as are utilized during standard speed operation.

11 Claims, 13 Drawing Sheets

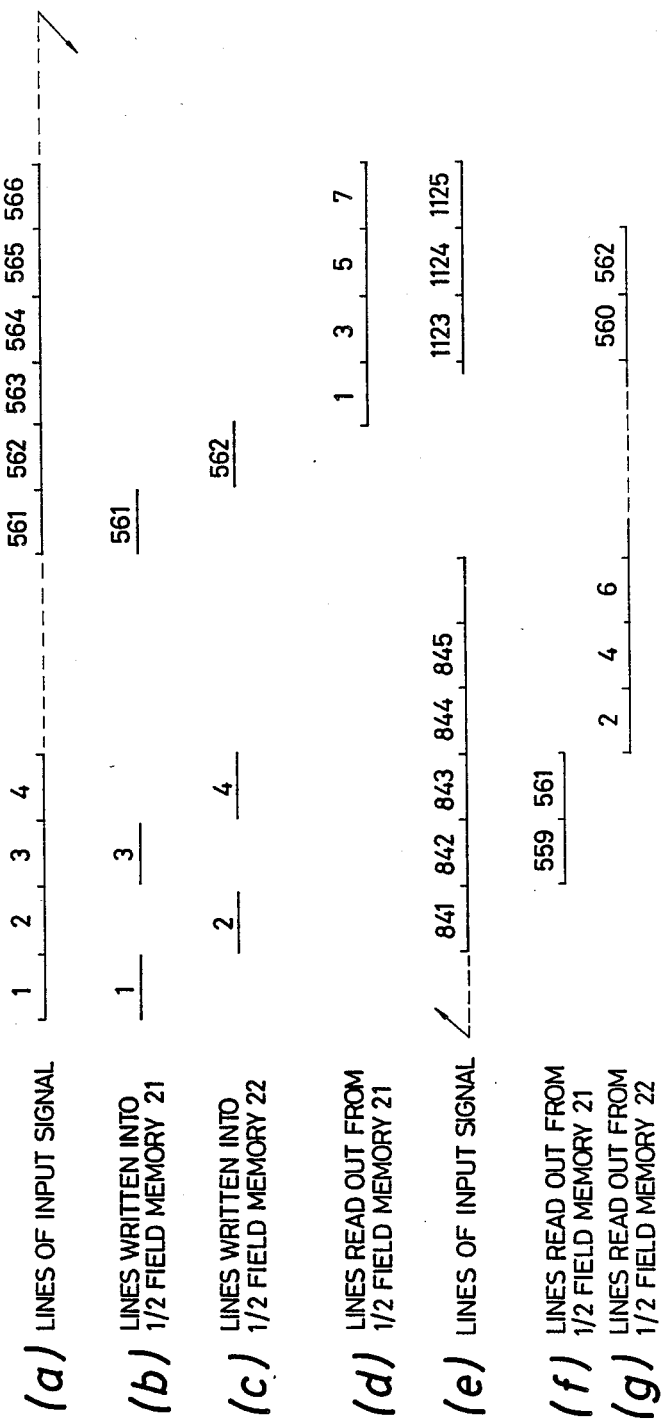

FIRST SCAN

SECOND SCAN

NORMAL PLAYBACK SPEED.

PLAYBACK IMAGE OF ONE FIELD, BEFORE PROCESSING.

FIRST SCAN

SECOND SCAN

QUADRUPLE-SPEED PLAYBACK.

PLAYBACK IMAGE OF ONE FIELD, BEFORE PROCESSING.

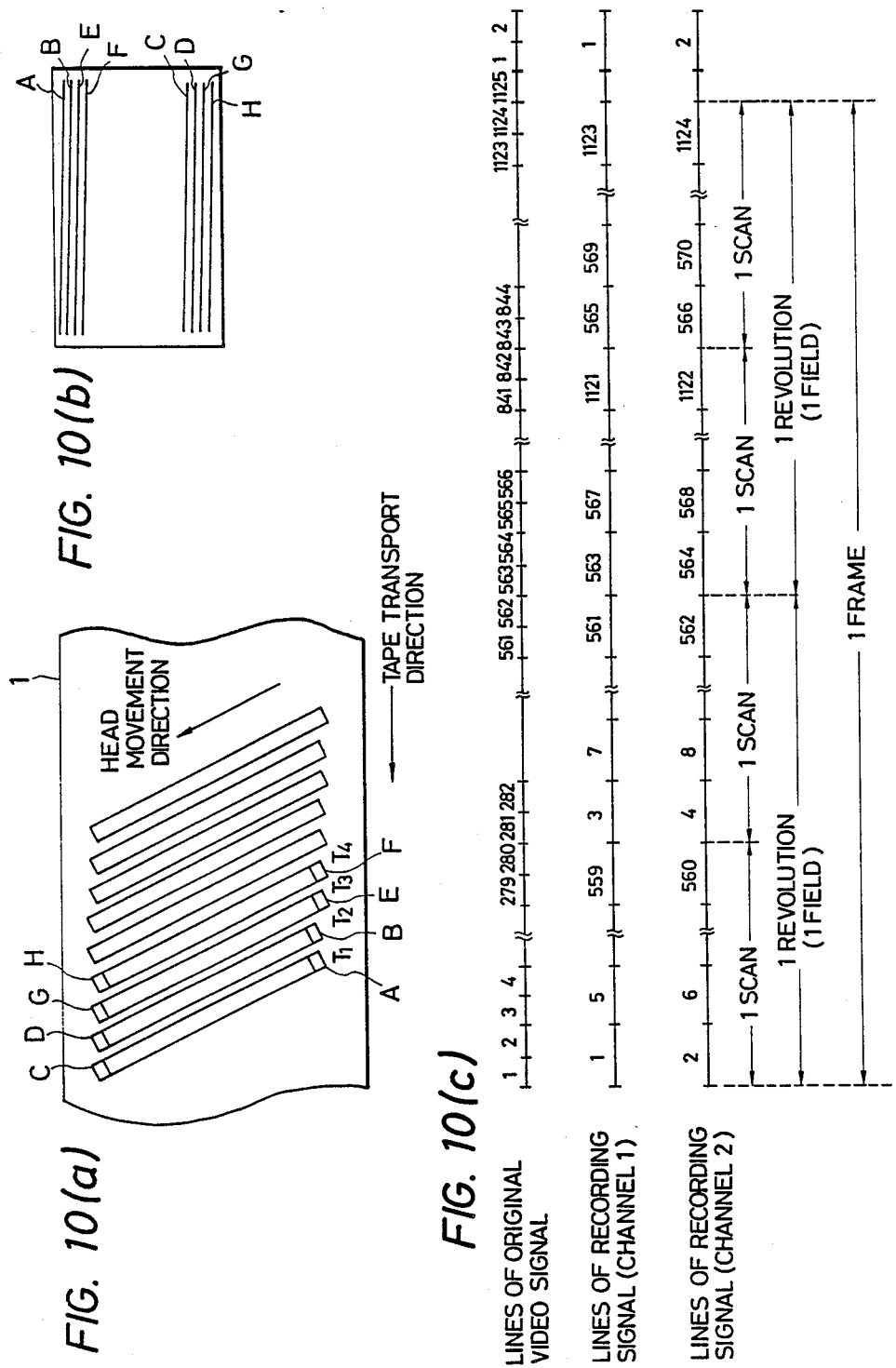

VIDEO SIGNAL RECORDING METHOD AND APPARATUS FOR FIELD-SEGMENT RECORDING

This application is a continuation of application Ser. No. 015,355 filed Feb. 17, 1987, and now abandoned.

BACKGROUND OF THE INVENTION

The present invention relates to a helical scan type of video tape recorder (abbreviated in the following to VTR), and more particularly to an improved method and apparatus for segment recording of video signals, i.e. recording of each field of a video signal as a plurality of segments, which are recorded on respective diagonal tracks on a magnetic tape.

A helical scan type of VTR employs a rotating cylinder, generally referred to as the head drum, having at least one pair of electromagnetic recording/playback heads mounted on the drum periphery, spaced apart by 180°. The most generally utilized recording systems are the VHS and the Beta systems. FIG. 1 is a simple plan view to illustrate the positional relationships between the magnetic tape and the head drum of a helical scan VTR. FIGS. 2(a) and 2(b) respectively are diagrams to illustrate the recording format and the manner of scanning the image which is recorded and played back, for the case of a conventional recording method in which each field of the video signal is recorded to occupy a single recording track on the magnetic tape. In FIG. 1, numeral 1 denotes a magnetic tape, and 2 and 3 denote respective electromagnetic recording/playback heads (referred to in the following simply as heads), while numeral 4 denotes a rotary drum having heads 2 and 3 fixedly mounted at diametrically opposed positions on the periphery thereof. The direction of transport T of tape 1 is oriented diagonally with respect to the plane of rotation of heads 2 and 3 (rotating in the direction indicated as H), so that recording tracks produced by heads 2 and 3 are successively aligned diagonally along the tape 1. A successively recorded set of these tracks is shown in FIG. 2(a), indicated by numeral 5. Each of the tracks 5 is produced by rotation of one of the heads 2 or 3 through 180°. Assuming a 2:1 interlace system, in which each frame of the video signal consists of two successive fields, the magnetic tape 1 will advance by a distance P shown in FIG. 2(a), during recording of each frame of the video signal, i.e. one field is recorded on each track. With such a VTR, designating as A and B the positions at which two horizontal scanning lines of a first field are recorded on tape 1 (at the beginning and end, respectively of one of tracks 5), and C and D the positions at which two corresponding lines of the succeeding field are recorded, then the positions at which these lines will appear on the displayed image following playback are as shown in FIG. 2(b).

With such a recording method, since each field of the video signal is recorded in one track on the tape, the speed of rotation of the head drum (in revolutions per second) must be identical to the frame repetition frequency (in Hz) if a 2:1 interlace ratio is employed.

In order to design a two-head helical scan VTR which is capable of recording wide-band video signals of a high-definition television system, in accordance with NTSC standards, it is possible to adopt either of the following methods:

(a) Dividing the input signal into a plurality of channels for recording purposes.

(b) Increasing the relative velocity between the magnetic tape and the heads, by increasing the speed of rotation of the head drum.

A video recording apparatus for wide-band video signals can be implemented by utilizing either of methods (a) or (b) above, or a combination of both methods. If method (b) is used, then it is essential to employ a segment recording technique. A 2-segment recording method will be briefly described here. In order to record a high-definition NTSC video signal having double the bandwidth of a conventional video signal, it is necessary to make the speed of rotation of the head drum twice the conventional speed of rotation (i.e. corresponding to twice the frame repetition frequency), and to double the transport speed of the magnetic tape. In this case the relationship between the recording format and the displayed image, for the case of a prior art 2-segment recording method, will be as shown in FIGS. 3(a) and 3(b). In FIG. 3(a), P' denotes the distance through which the tape 1 is transported during one field interval. Each field is divided into two equal segments, each of which is recorded to occupy one of tracks 5 on tape 1. A' and B' denote positions at which two horizontal scanning lines of a first segment of a field are recorded on tape 1 respectively at the beginning and end of one of tracks 5, and C' and D' the positions at which two corresponding lines of the other segment of that field are recorded. The positions at which these lines will appear on the displayed image following playback are indicated by the corresponding letters A' to D' in FIG. 3(b), in which SG1 denotes a first segment and SG2 a second segment.

With such a prior art 2-segment recording method, it is found that the following serious problems arise:

(1) If a non-standard playback operating mode is executed, such as slow-motion playback, still playback or rapid-motion playback (these being collectively referred to in the following as varied-speed modes, for simplicity of description), in which sets of tracks are successively skipped over by the heads, then the two segments SG1, SG2 of each field will become mutually intermingled in such a manner that a satisfactory image cannot be displayed.

(2) The high-frequency signal which is produced from each head during playback (referred to in the following as the RF, or radio-frequency, signal) is unstable in level during the times at which each head traverses a region of the magnetic tape which is close to an edge of the tape. As a result, the signal/noise ratio of the playback signal which is produced as output by the VTR will be unstable during playback of these portions of the tape. However with the prior art 2-segment recording method described above, parts of the displayed image corresponding to these playback portions from the tape edge will appear at the center of the display, and the resultant effects are therefore very conspicuous.

Problems (1) and (2) above will be described in more detail, referring first to FIGS. 4(a), 4(b) and 4(c). FIG. 4(a) illustrates the recording pattern produced by the prior art 2-segment recording method of FIG. 3. Numerals 6 and 6' respectively denote the paths which are traced out by the two heads 2 and 3 when the magnetic tape 1 is advanced at four times the standard speed during playback. A set of 11 successive tracks is respectively designated as F1 to F11, with the segment pairs of four successive fields (designated as the first to the fourth fields in FIG. 4(b)) being recorded in tracks F1 to F8. Thus as indicated in FIG. 4(b), during operation at normal tape transport speed, the contents of track F1 will appear in the upper half of the display and the contents of F2 in the lower half of the display during the first field. The display positions of the contents of tracks F3 to F8 during normal playback operation are similarly indicated in FIG. 4(b) for the second to the fourth fields. The hatched portions S1 to S8 in FIG. 4(b) indicate the positions at which the contents of the tape track portions S1 to S8 of fields F1 to F8 shown in FIG. 4(a) will appear on the display, during operation at four times the normal playback speed, i.e. as the heads 2 and 3 move along paths 6 and 6' respectively.

FIG. 4(c) illustrates scanning of a display produced by playback at four times normal speed corresponding to FIG. 4(b). As shown, portions of the upper half and lower half of the image to be displayed, each having a width which is equal to ⅛th of the total image height, are intermingled in an alternating manner. The displayed image will therefore be confused and unsatisfactory.

In the above example, high-speed playback at four times normal playback speed is utilized. However similar intermingling of portions of the image will occur in general when playback is performed at S times the normal speed, or when slow-speed playback is performed at 1/S times the normal speed, where S is an integer.

As will be clear from the above, the order in which the segments are played back will depend upon the tape transport speed. Thus if it is attempted to produce a correct displayed image which is free from the intermingling effect described above, by performing appropriate signal processing during playback operation, such processing will be extremely difficult to put into practice. This is because the processing must be varied in accordance with different tape transport speeds.

The second problem (2) mentioned above can be understood by referring to FIG. 5, which shows the form which the envelope of the playback RF signal may take. FIG. 5 shows envelope portions corresponding to two segments, with A', B', C' and D' corresponding to the identically designated playback timings of FIGS. 3(a) and (b). The reductions in envelope amplitude which occur at times B' and D' are due to the heads being in insufficiently close contact with the tape at these times, i.e. as the heads scan across positions near an edge of the tape. As a result, the output signal from the VTR will have a relatively low S/N ratio at time B' and relatively high S/N ratio at time C'. These times correspond to positions near the center of the display produced by playback from the VTR, so that a very conspicuous unevenness of picture quality is produced.

The above problems of the prior art have been described for the case of the 2-segment recording method. However such problems will become increasingly severe if the number of segments is increased. More specifically, in the case of problem (1) above, portions of a greater number of segments will become intermingled in the displayed image during playback. In the case of problem (2) above, a greater number of regions of display quality irregularity will appear on the displayed image.

SUMMARY OF THE INVENTION

It is an objective of the present invention to provide a method and apparatus for video signal recording with each field of an input video signal being divided into a plurality of segments which are recorded on respectively different tracks of a magnetic tape, which will overcome the problems of the prior art described above. Such a method and apparatus enables playback operation to be executed at playback speeds which are higher than or lower than the standard speed, providing an output playback signal which produces a satisfactory displayed image during such non-standard playback speed operation, with only relatively simple circuits being required to perform signal processing for recording and playback, and with no changes or adjustments being required in such signal processing circuits for different playback speeds.

With a method and apparatus according to the present invention, each segment of a field is derived from the input video signal by selecting one out of successive groups of horizontal scanning lines of the field, e.g. one in every two lines in the case of two-segment recording. In that case, all of the even-numbered horizontal scanning lines of a field will be recorded on one track of a magnetic tape, while the odd-numbered horizontal scanning lines of that field will be recorded on one immediately adjacent track. Thus, although each track will have recorded thereon only ½ of the horizontal scanning lines of a field, these lines will extend substantially from the beginning to the end of the field, i.e. will substantially entirely extend over a video image represented by that field.

More specifically, a method of video signal recording according to the present invention is characterized in recording a field composed of scanning lines of a video signal by recording N respectively different sets, each comprising substantially 1/N scanning lines of the field, on N respective diagonal tracks of a magnetic tape, where N is an integer equal to or greater than 2, each set containing one in each of successive groups of N scanning lines of the input video signal field, whereby each of the tracks has recorded thereon a set of the scanning lines extending from substantially the commencement to the end of the field.

A video signal recording and playback apparatus according to the present invention for recording and playback of a video signal comprises:

recording circuit means for recording a field of the video signal on N diagonal tracks of a magnetic tape, where N is an integer equal to or greater than 2, by recording N respectively different sets of the scanning lines on respective ones of the tracks, each set containing substantially 1/N of the scanning lines in the field, composed of one in each of successive groups of N scanning lines of the field, and;

playback circuit means for executing playback of the field after recording on the magnetic tape by processing playback signals derived from the N tracks to combine the N sets of scanning lines into a sequence which is identical to a sequence of scanning lines in the video signal field.

BRIEF DESCRIPTION OF THE DRAWINGS

FIG. 4(a) is a diagram for illustrating the recording format of a prior art VTR employing 2-segment recording, for the case of high-speed playback operation, while

FIG. 8(a)–(g), is a diagram showing the sequence of horizontal scanning lines in a recording signal of the embodiment of FIGS. 7(a) and 7(b);

FIGS. 10(a), 10(b) and 10(c) are diagrams for assistance in describing the recording format of a second embodiment of the present invention;

DESCRIPTION OF THE PREFERRED EMBODIMENTS

Figure 1:
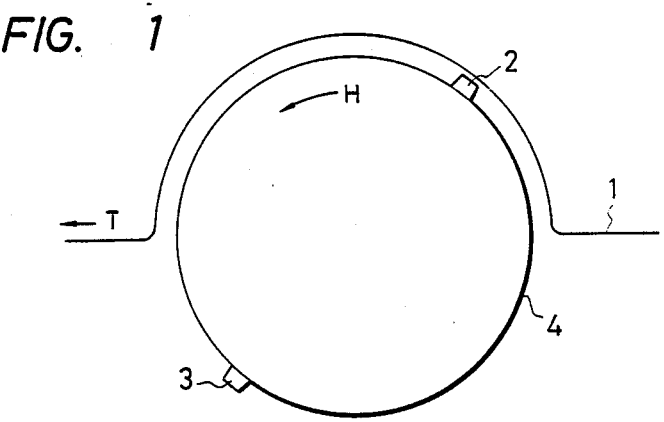
FIG. 1 is a diagram to illustrate a head drum of a rotary 2-head helical scan VTR and a magnetic tape.
Figure 2A:
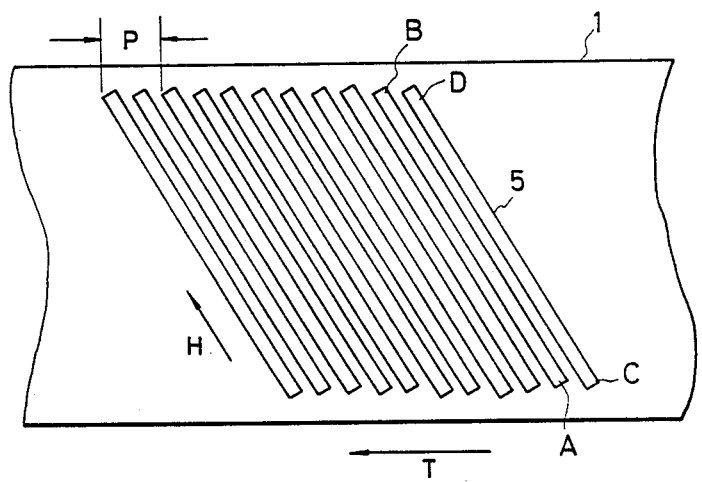
FIGS. 2(a) and 2(b) are diagrams for respectively illustrating the recording format and corresponding display image scanning for a prior art rotary 2-head helical scan VTR.
Figure 2B:
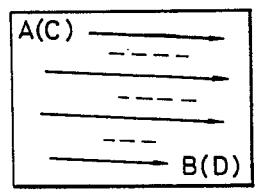
Figure 3A:
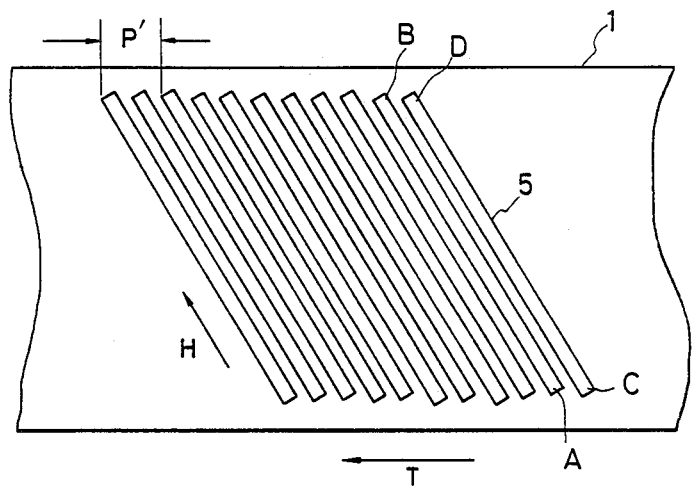
FIGS. 3(a) and 3(b) are diagrams for respectively illustrating the recording format and display image scanning for a prior art rotary 2-head helical scan VTR employing a 2-segment recording method.
Figure 3B:
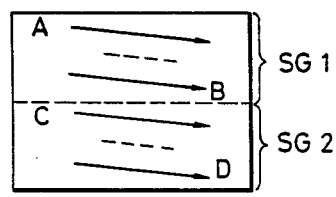
Figure 4A:
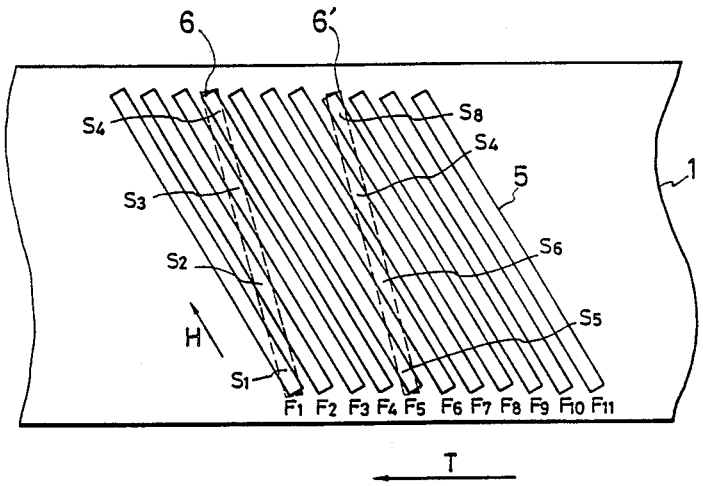
Figure 4B:
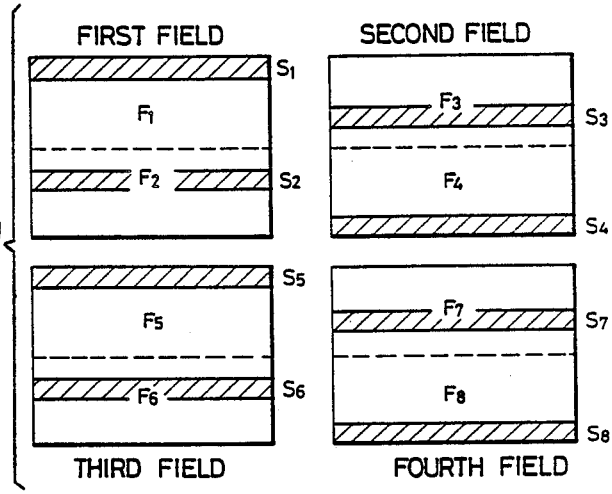
FIGS. 4(b) and 4(c) are corresponding diagrams to illustrate the resultant image scanning during playback.
Figure 4C:
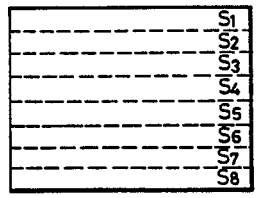
Figure 6A:
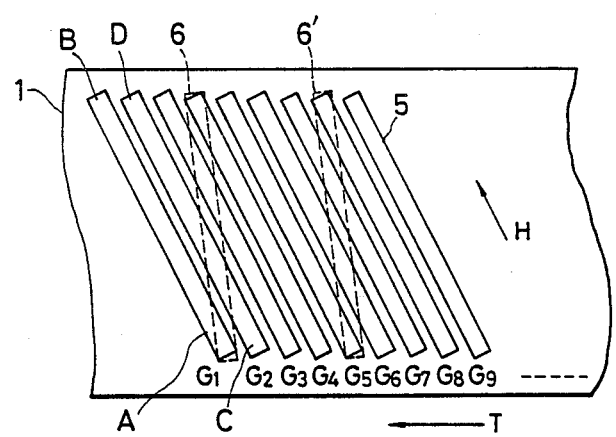
FIGS. 6(a), 6(b) and 6(c) are diagrams for illustrating the recording format of a recording method according to a first embodiment of the present invention.

A first embodiment of a method and apparatus for video signal recording will be described, referring first to FIGS. 6(a), 6(b) and 6(c). This embodiment comprises a rotary 2-head helical scan VTR for recording and playback of a high definition video signal. This signal will be assumed to have 1125 horizontal scanning lines (hereinafter referred to simply as lines) in each frame, a field repetition frequency of 60 Hz, and a 2:1 interlace ratio. The speed of rotation of the head drum of the VTR is 60 revolutions/second (i.e. corresponding to 60 Hz). FIG. 6(a) shows the pattern of tracks 5 recorded on the magnetic tape 1, with a set of 9 successive tracks being designated as G1 to G9, the tracks being aligned diagonally with respect to the tape transport direction T as shown. A and B in FIG. 6(a) denote the recorded positions of two lines at the start and end respectively of track G1, while D and C denote the positions of two corresponding lines recorded in track G2. The positions at which these lines will appear on the displayed image, upon playback of the tape, are indicated as A to D in FIG. 6(b). As in the prior art example of FIGS. 3 and 4 above, one field of the video signal is recorded in two adjacent tracks. However the sequence in which the lines of each field are recorded is basically different from that of the prior art described hereinabove. FIG. 6(c) illustrates the manner in which the horizontal scanning lines are recorded on tracks 5. As shown, the odd-numbered lines of one field (i.e. of each of the segments consituting that field) are first recorded on one track, indicated as track $G_{4n-3}$. The even-numbered lines of that field are then recorded on the next track $G_{4n-2}$. In a similar manner, the odd-numbered lines of the next field are then recorded on the next track, and the even-numbered lines of that field on the succeeding track. In this way, all of the lines of one frame have been recorded in four successive tracks.

Figure 6B:
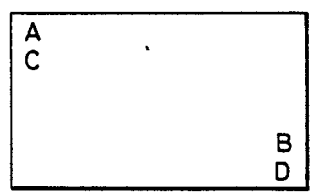
Figure 6C:
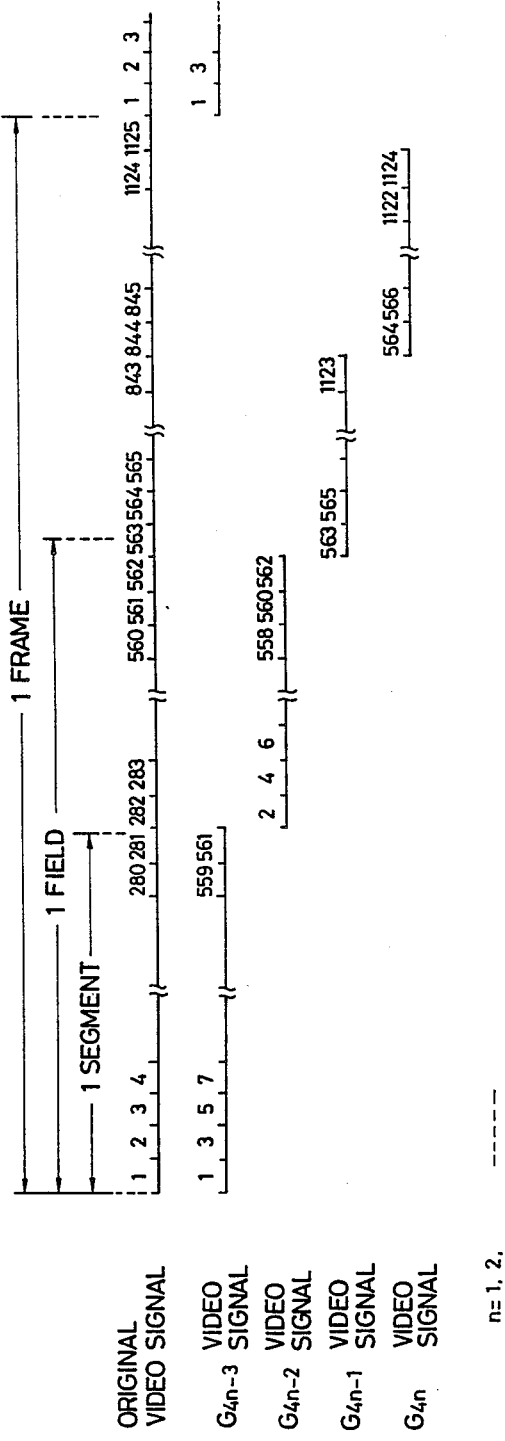
Figure 7A:
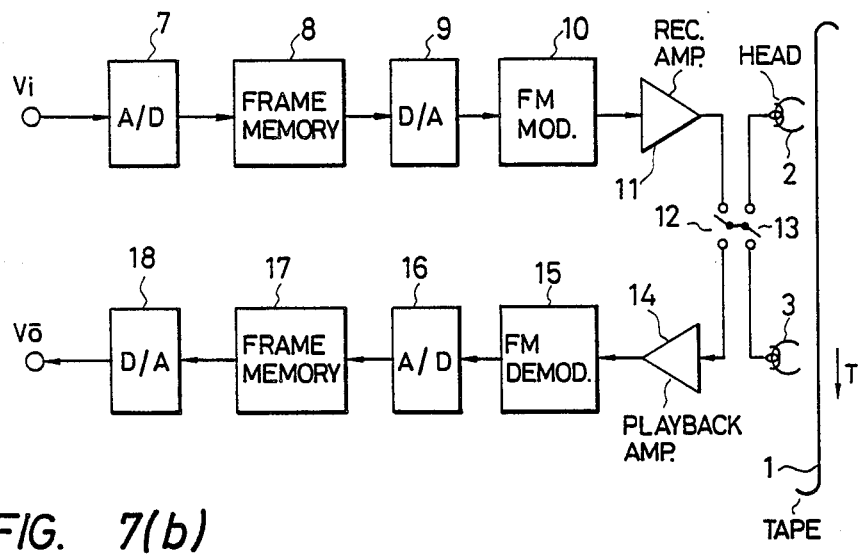
FIGS. 7(a) and 7(b) are block circuit diagrams of an embodiment of a VTR apparatus employing a recording format in accordance with the first embodiment of the present invention.
Figure 7B:
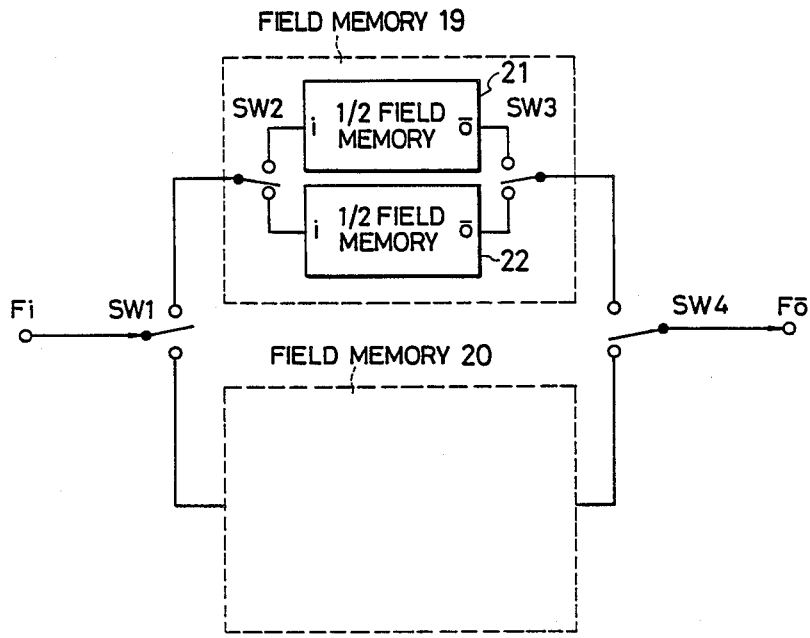

FIG. 7 is a simple block circuit diagram of a video signal recording and playback apparatus according to the first embodiment of the invention for executing recording as illustrated in FIGS. 6(a), 6(b) and 6(c). In FIG. 7, Vi denotes a video signal input terminal, numeral 7 denotes an analog/digital (hereinafter A/D) converter, 8 is a frame memory, 9 is a digital/analog (hereinafter D/A) converter, 10 is an FM modulator, and 11 is a recording amplifier. Numeral 14 denotes a playback amplifier, 15 an FM demodulator, 16 an A/D converter, 17 a frame memory, 18 a D/A converter, and $V_o$ a video output signal terminal. An input video signal is applied to terminal $V_i$, and converted to digital signal form by A/D converter 7. The data contents of that digital signal are stored in frame memory 8. FIG. 7(b) is a block circuit diagram to illustrate the internal configuration of frame memory 8. This is made up of a pair of field memories 19 and 20, and switches SW1 and SW4. The field memory 19 consists of a pair of ½-field memories 21 and 22, and switches SW2 and SW3. The field memory 20 has an identical configuration to field memory 19. The digital signal produced from A/D converter 7 is applied to an input terminal Fi of frame memory 8. The connection status of switch SW1 is inverted at the start of each successive field to supply the digital signal to field memory 19 during each first field of each frame and to field memory 20 during each second field of each frame. The connection status of switch SW2 is inverted at the start of each horizontal scanning line so that data representing successive horizontal scanning lines are alternately stored in ½-field memories 21 and 22 respectively. After completion of writing a first field of a frame into memory 19, the connection status of SW1 is inverted and the second field of that frame is then written into field memory 20. During this second field interval, field memory 19 operates in a read-out mode. During a first ½ field interval, read-out is executed from ½-field memory 21, and during the succeeding ½ field interval, read-out is executed from ½-field memory 22. The connection status of switch SW3 is inverted at the start of each successive ½-field interval in synchronism with the read-out operations of ½-field memories 21 and 22, i.e. to connect the output of switch SW3 to the ½-field memory from which data is being read out.

The operation of field memory 19 described above is illustrated by the timing chart of FIG. 8.

Write-in to field memory 20 is executed during the second field interval of each frame and read-out from memory 20 is performed during each succeeding first field interval in the same way as described above for field memory 19.

It will be understood that the connection status of switch SW4 is always the inverse of that of switch SW1.

As a result of the signal processing performed in this way by means of frame memory 8, a time-sharing output signal is produced from frame memory 8 for recording in the format shown in FIG. 6. This output signal is applied to D/A converter 9, to be converted to an analog video signal, which is applied through the FM modulator 10 to the recording amplifier 11 and recording/playback changeover switch 12 to the head changeover switch 13, and hence to the recording/playback heads 2 and 3, to be recorded on tape 1.

During playback, the signal which has been recorded on tape 1 is read out by heads 2 and 3, and transferred through switches 11 and 12, playback amplifier 14, and FM demodulator 15 to be output therefrom as an analog video signal. This signal is converted into digital signal form, and this digital signal is applied to frame memory 17 to be temporarily stored therein in an identical manner to that described hereinabove for frame memory 8. The signal processing performed by frame memory 17 is the inverse of that of frame memory 8, and the configuration can be identical to that of frame memory 8. More specifically, designating a set of switches of frame memory 17 corresponding to switches SW1, SW2, SW3 and SW4 of frame memory 8 as SW1', SW2', SW3' and SW4' respectively, then the connection status of SW1' is inverted once in each field, that of SW2' is inverted once in every ½-field interval, that of switch SW3' once in every horizontal scanning line, and switch SW4' once in every field, with the connection status of switch SW1' always being the inverse of that of SW4'. The internal configuration of frame memory 17 is omitted from the drawings.

A playback video signal is thereby produced from the output of frame memory 17 which is identical in data content to the previously recorded video signal. This output signal is converted into analog form by D/A converter 18 to appear on output terminal $V_o$.

For simplicity of description, various components which are necessary to the operation of the apparatus have been omitted, i.e. components such as low-pass filters, clock signal generating circuits, memory control circuits, etc. In addition, although the apparatus has been described as utilizing circuit components (A/D converter, frame memory, D/A converter, etc) during recording operation which are separate from similar components used during playback operation, it will be understood that it is equally possible to employ each of such components in common for both recording and playback operation. In addition, while frame memories 8 and 17 have been indicated and described as individual blocks, each of blocks 8 and 17 is intended to signify a combination of a memory circuit (having a general configuration as shown in FIG. 7(b)) and a memory control circuit for controlling the operation of the memory circuit and the switching of signal input and output connections to the various sections of the memory circuit, e.g. by controlling switches SW1 etc. shown in FIG. 7(b).

With the embodiment described above, the 1125th horizontal scanning line of each frame, shown in FIGS. 6(c) and 8, will not be recorded. Since this is always the final scanning line of each frame, and occurs within the vertical flyback interval, omission of this line will cause no problems in practice.

Figure 9A:
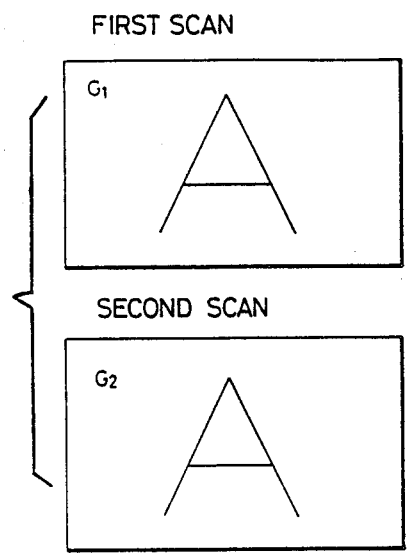
FIGS. 9(a), 9(b), 9(c) and 9(d) are diagrams for illustrating varied speed playback operation by the first embodiment of the present invention.
Figure 9B:
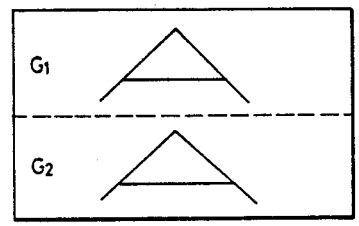

The operation of the above embodiment will now be described for the case of varied-speed playback of a tape which has been recorded in the format described hereinabove, and a comparison will be made between operation in this mode and operation during normal playback operation at the standard tape transport speed FIGS. 9(a) to 9(d) are diagrams for assistance in this comparison. FIGS. 9(a) and 9(b) ilustrate playback operation at normal speed. In FIG. 9(a), G1 and G2 denote the data contents of two successive fields of a video signal produced by playback operation of this embodiment (prior to signal processing in A/D converter 16, frame memory 17 etc.), with field G1 being produced as one of the heads scans one track on the tape, and field G2 as the other head scans the next track. The original video signal represents a simple image, i.e. the capital letter A. One line of each field will be omitted, as described above. As can be seen, the contents of the video signal which is produced as each head completely scans a track will represent the entirety of the image from top to bottom. If it is assumed for the purposes of illustration that these video signals produced from the two heads are combined and displayed, without the aforementioned processing being applied, then the double image shown in FIG. 9(b) would appear on the display.

In the case of the prior art examples of 2-segment recording described above, of course, each of these signals would contain data representing only ½ of the entire image.

Figure 9C:
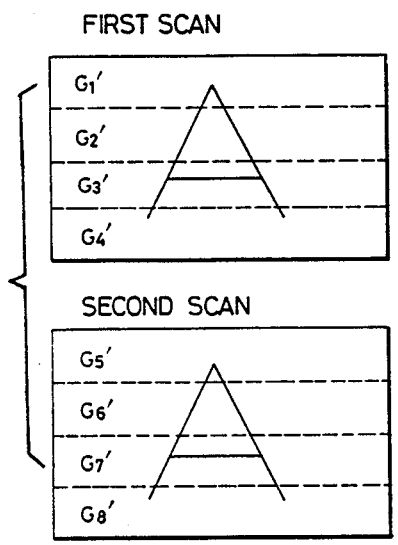
Figure 9D:
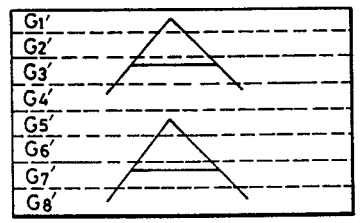

If on the other hand playback at four times the normal speed is performed, then the two heads will respectively scan across the tape as indicated by paths 6 and 6' in FIG. 6(a). Thus, as shown in FIG. 9(c), as one of the heads moves along path 6, signals G1', G2', G3' and G4' resulting from playback of portions of tracks G1, G2, G3 and G4 respectively will be successively produced. Similarly, signals G5', G6', G7' and G8' resulting from playback of portions of tracks G5, G6, G7 and G8 will be produced as the second head scans along path 6'. If these signals produced by successive scans by the two heads were to be applied directly to the display, the resultant image would be as shown in FIG. 9(d). During each scan across the tape by a head, the content of the video signal produced by playback from that head will represent the entirety of the image to be displayed. Thus, two separate images would be displayed in this case at the top and the bottom of the display screen respectively.

It can thus be understood that processing of the playback signals produced during operation at four times the normal playback speed can be performed as described hereinabove for the case of normal speed playback (i.e. using A/D converter 16, frame memory 17 etc.), since the data content of the output signal produced by each scan of a head across the tape will correctly represent the entirety of the original image. It will be further understood that this will also be true for playback at other speeds besides the normal speed and four times normal speed.

With the recording format and method described above, the positions at which pairs of successively occurring scanning lines are recorded on the tape will be mutually adjacent, i.e. on mutually adjacent tracks. For example referring to FIG. 6, the data for the first horizontal scanning line of a frame will be recorded in a first position of track $G_{4n-3}$, while data for the second horizontal scanning line will be recorded at the corresponding position of the immediately adjacent track $G_{4n-2}$. Thus, horizontal scanning lines which are to appear at mutually adjacent positions of the display will be recorded at mutually adjacent positions on the tape. As a result, a substantial reduction of cross-talk is achieved, so that the picture quality resulting from playback of the recorded signal is enhanced. Such a physical arrangement of the recorded data is impossible to implement if a prior art segment recording method is employed, so that the present invention enables a substantially better picture quality to be attained than has been possible in the prior art.

Figure 5:
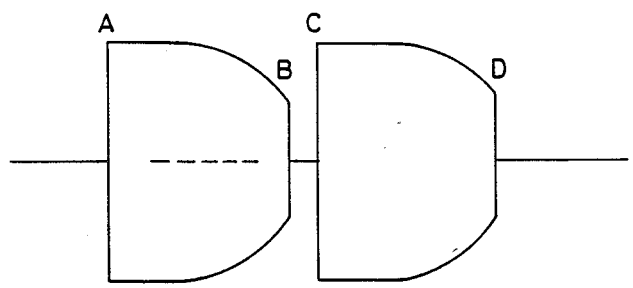
FIG. 5, A–D, is a diagram illustrating the general form of the envelope of an RF playback signal of a prior art VTR employing the 2-segment recording method.

Furthermore, in the case of the problem which arises with respect to the envelope of the RF playback signal described hereinabove with reference to FIG. 5, positions B and C shown in FIG. 5 will respectively correspond to positions at the upper edge and lower edge of the display, with an apparatus according to the present invention. Thus, the discontinuity of the S/N ratio of the displayed picture which must occur with a prior art segment recording method will be eliminated by the present invention.

In the first embodiment described above, all of the even-numbered horizontal scanning lines of a field of the input video signal are recorded on one track, while all of the odd-numbered lines are recorded on a second track immediately adjacent to the first track. Alternatively stated, each field is recorded on two tracks, as two different sets of horizontal scanning lines. Each of these sets consists of one out of every successive pair of horizontal scanning lines of the original video signal. However the invention is equally applicable to recording each field upon more than two successive tracks. For example, every second one of the even-numbered lines of the video signal could be recorded on a first track, the remaining even-numbered lines on a second track, every second one of the odd-numbered lines on a third track, and the remainder of the odd-numbered lines on a fourth track, i.e. with ¼ of a field being recorded each of four successive tracks. In this case each of these tracks has recorded thereon a set of horizontal scanning lines consisting of one out of every four successive lines of the original video signal. In general, with a method and apparatus according to the present invention, one field of a video signal is recorded as N respectively different sets of horizontal scanning lines each containing substantially 1/N of the scanning lines of the field, on N respective diagonal tracks on a magnetic tape, where N is an integer equal to or greater than 2. Each of these sets consists of one in each of successive groups of N horizontal scanning lines of the original video signal.

With an apparatus according to the first embodiment of the invention described above, a field is recorded on these N tracks by executing N successive recording scans by the heads across the tape (where N is equal to two in the specific example described), since 2-head helical scanning is performed. However it would be equally possible to employ a rotary head having two or more sets of diametrically opposed heads, and to record two or more of the aforementioned sets of scanning lines of a field in parallel on two or more adjacent tracks.

In the above description, a set of scanning lines consisting of substantially ½ of the total lines in one field are recorded on each track. Since the field frequency is 60 Hz, the head drum rotation speed must be 60 revolutions/second. However it would be equally possible to modify the embodiment to provide for recording fewer lines on each track, e.g. to record ¼ of each field per track, in which case the drum rotation speed would be 120 revolutions/second. In general, if 1/N of the lines of a field are recorded in each recording scan, the speed of rotation of the head drum must correspond to (N/2)×field frequency. This is also true for the embodiments described in the following.

A second embodiment of a method and apparatus according to the present invention will be described with reference to FIGS. 10 to 13. This embodiment is applicable to a high-definition television video signal having 1125 horizontal scanning lines per frame, a field repetition frequency of 60 Hz, and 2:1 interlace. Bandwidth compression is applied to the input video signal, to bring the bandwidth to approximately four times the NTSC standard, and time-axis expansion is utilized to divide the input video signal into two channels. The embodiment employs a rotary 4-head helical scan VTR, having two sets of 2-channel heads mounted on a rotary drum. The two sets of heads are mutually spaced apart by 180°, and the drum rotation speed is 60 revolutions/second.

FIGS. 10(a) and 10(b) respectively illustrate the recording format and the image scanning arrangement of this embodiment. In FIG. 10(a), T1 to T4 denote four successive tracks recorded on tape 1. A, B, E and F designate positions of initial horizontal scanning lines recorded on tracks T1 to T4 respectively, while C, D, G and H denote respective positions of final lines on these tracks. FIG. 10(b) shows the positions at which these initial and final scanning lines will appear on the displayed image resulting from playback. FIG. 10(c) illustrates the relationship between the positions at which data for respective scanning lines are recorded on the tracks and the original video signal. As shown, data for the even-numbered lines of each frame of the original video signal are recorded through one channel and data for the odd-numbered lines through the other channel. During one recording scan across the tape (to record two diagonal tracks in parallel), a set of horizontal scanning lines consisting of one in every two successive even-numbered lines is recorded on one track, while a set consisting of one in every two successive odd-numbered lines is recorded on the other track. During the succeeding recording scan, the remaining even-numbered lines are recorded on a third track while the remaining odd-numbered lines are recorded on a fourth track. In this way, each field is recorded on four successively adjacent tracks by two successive recording scans.

It should be noted that the invention is not limited to time-axis expansion and division of the input video signal into only two channels for parallel recording, with time-axis expansion of each line by an amount equal to the original horizontal scanning line duration, as in this second embodiment. In general, the invention is applicable to performing time-axis expansion of the video signal by K times in units of horizontal scanning lines, where K is an integer greater than or equal to 2, dividing the time-expanded video signal into K parallel channel signals (where N is an integer greater than or equal to 2, and recording a field of the video signal by performing parallel recording of the K channel signals, with the sequence of horizontal scanning lines in each channel signal being arranged such that each track has recorded thereon a set of horizontal scanning lines extending substantially from the start to the end of the field.

Figure 11:
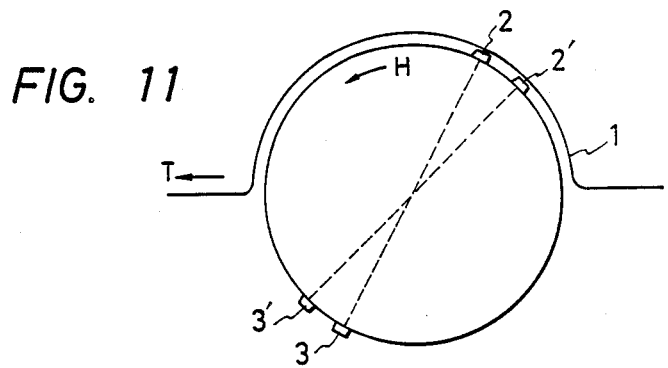
FIG. 11 is a simple plan view to illustrate the general configuration of a rotary head drum of a rotary 4-head 2-channel helical scan VTR utilized with the second embodiment of the present invention.

FIG. 11 is a simple plan view illustrating the configuration of the head drum of this embodiment. Numerals 2 and 2' denote a first pair of heads for simultaneously recording on two adjacent tracks on tape 1 the video signal which has been divided into two channels as stated above, as the drum 4 rotates through 180°, while 3 and 3' denote a second pair of heads which perform the same function during the next 180° of drum rotation. For example, recording is simultaneously performed on tracks T1 and T2 of FIG. 10(a) by heads 2, 2', and performed simultaneously on tracks T3, T4 by heads 3 and 3'. The original video signal is thereby subjected to time-axis expansion in 1H units (where 1H is the duration of each horizontal scanning line).

As shown in FIG. 10(b), all of the scanning lines recorded at the starting positions of the respective tracks (A, B, . . . .) will appear at the top part of the displayed image, and thereafter as a pair of heads successively advance along the tape, the horizontal scanning lines which appear at the lower part of the display will be successively reached. The scanning line data appearing at the ends of the tracks (C, D, G, . . .) will be displayed at the bottom of the screen. With such an arrangement, as for the first embodiment of the invention described above, no intermingling of the display data will occur when playback is performed at a higher or a lower speed than the normal playback speed, since each track has recorded thereon a set of horizontal scanning lines which extend substantially from the start to the end of a field. Thus, as in the first embodiment, the playback data produced by a single scan of the heads across the tape will represent the entirety of the image to be displayed. As a result, a correct image can be produced by applying identical processing to the playback signal during standard speed operation, high speed and low-speed playback operation.

Figure 12A:
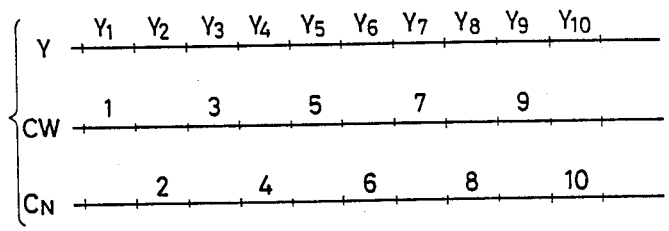
FIGS. 12(a) and 12(b) and FIG. 13 are diagrams for assistance in describing a signal processing method employed with the second embodiment of the present invention, which includes time-axis compression and multiplexing of chrominance signal components of an input video signal with a luminance component of that video signal.
Figure 12B:
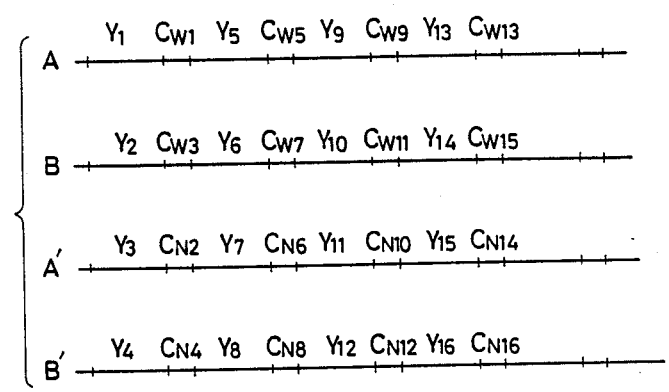
Figure 13:
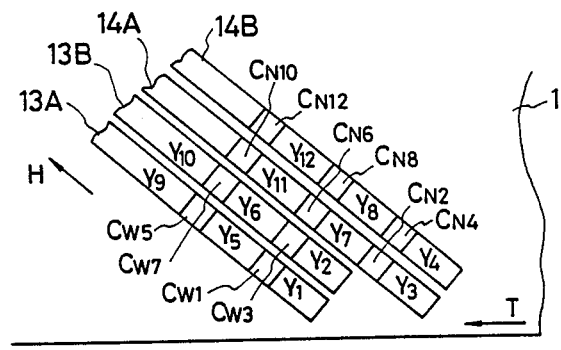

In the above, no distinction has been made between the luminance and the chrominance components of the video signal for simplicity of description. A high definition television signal contains three basic components, i.e. the luminance (or Y) signal, and the chrominance (Cw and Cn) signals. These signals can be multiplexed by applying TCI (Time Compressed Integration), whereby the chrominance signals are subjected to time-axis compression and are multiplexed to fall within the horizontal blanking intervals of the luminance signal. This method is desirable, since narrow-band transfer of the multiplexed signal for recording on a magnetic tape can be performed by transmitting that signal in a linearly sequential manner. This process is illustrated in FIGS. 12(a) and 12(b), in which the three components of a color video signal are supplied as three parallel signals (Y, Cw and Cn), which are multiplexed to produce a pair of 1-channel signals. In FIG. 12(b), the respective constitutions of these two channels signals while these are respectively applied to heads 2 and 2', to record a pair of tracks during one recording scan across tape 1, are designated as A and B. The respective constitutions of the two channel signals during the next recording scan are designated as A' and B'. The subscripts used in FIGS. 12(a) and 12(b) designate respective horizontal scanning line numbers. As indicated in FIG. 12(a), successive portions of the Cw component (designated in FIGS. 12(b) and 13 as $Cw_1$, $Cw_3$, etc.) are produced only during each odd-numbered horizontal scanning line of the video signal, and successive portions of the Cn component only during each of the even-numbered lines. When simultaneous 2-channel recording by the pairs of heads shown in FIG. 11 is executed for channel signals CH1 and CH2, the resultant recording pattern will have the form shown in FIG. 13 for two pairs of tracks recorded by two successive scans across the tape. It can be seen that data for chrominance signal components of the same type (e.g. $CW_1$, $CW_3$) are recorded at closely adjoining positions on a mutually adjacent pair of tracks. In addition, portions of the luminance signal data for horizontal scanning lines which will appear closely adjacent on the display (e.g. $Y_1$, $Y_2$) are recorded at closely adjoining positions on a mutually adjacent pair of tracks. As a result, deterioration of playback quality due to crosstalk between data recorded on the tape is effectively eliminated.

Figure 14:
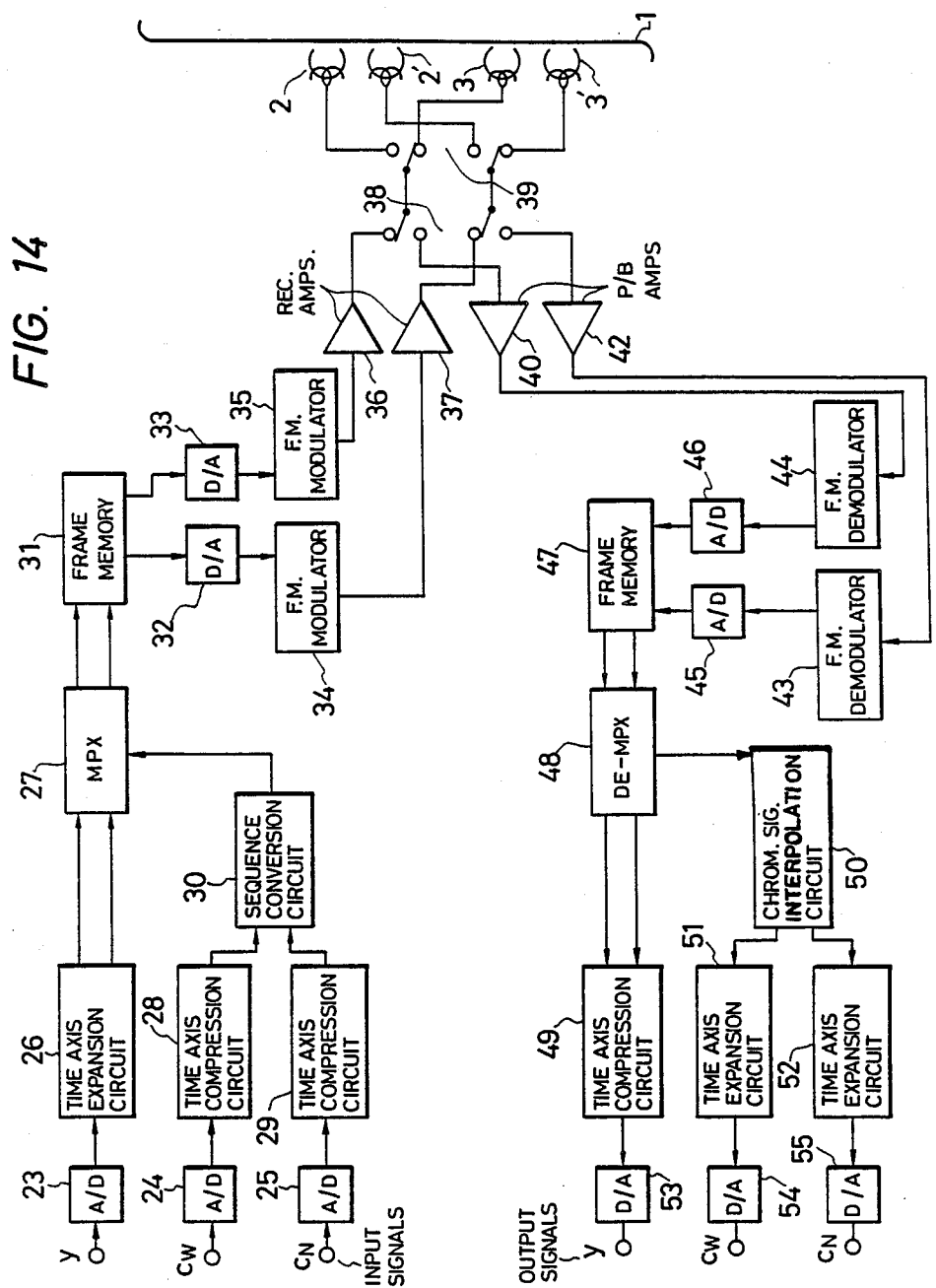
FIG. 14 is a block circuit diagram of a second embodiment of a VTR apparatus according to the present invention for performing signal processing as illustrated in FIGS. 12 and 13.

FIG. 14 is a general block circuit diagram of a video signal recording and playback apparatus according to the second embodiment of the present invention. This is applicable to a high-definition color television signal which is supplied as three signal components in parallel, i.e. a luminance component and two chrominance components. The apparatus performs time axis compression of the chrominance signal components, which have a relatively narrow bandwidth, and multiplexing of the time-compressed chrominance signals with the luminance signal component which has a relatively wide bandwidth, as described above with reference to FIGS. 12 and 13. Numerals 23, 24 and 25 denote respective A/D converters for converting the luminance signal (Y) component, a first chrominance signal (Cw) component and a second chrominance signal (Cn) component to digital signal form. The digital luminance signal from A/D converter 23 is applied to a time-axis expansion circuit 26, in which time-axis expansion by a factor equal to the duration of each horizontal scanning line of the video signal is executed, i.e. to produce as outputs a pair of channel signals in which the luminance signal data for each line occupies a time interval which is double that of the input video signal. The digital chrominance signals from A/D converters 24 and 25 are applied to respective time-axis compression circuits 28 and 29, which produce respective output signals in which the data for each successive portion of signals Cw, Cn is compressed from a duration equal to one horizontal scanning line interval (as shown in FIG. 12(a)) to an interval which is substantially equal to a horizontal flyback interval of the input video signal. The time-compressed output signals from circuits 28 and 29 are supplied to a sequence conversion circuit 30, which combines these two signals into a single channel signal in which the sequence of respective portions of the chrominance signals Cw, Cn are arranged suitably for multiplexing with the luminance signal. This single channel signal is supplied to a multiplexing circuit 27 to be multiplexed with the time-expanded luminance channel signals such that each chrominance signal portion corresponding to one horizontal scanning line of the input video signal (e.g. $Cw_1$) is inserted within a horizontal flyback interval of a time-expanded luminance channel signal. A pair of multiplexed channel signals are thereby produced from multiplexer 27. This process will be clear from FIGS. 12(a) and 12(b). However the line number sequence of one of the channel signals from multiplexer 27 will of course be 1, 3, 5, 7, . . . . while that of the other channel signal output will be 2, 4, 6, 8, . . . . . These multiplexed channel signals are applied to a frame memory circuit 31, which functions to process these input channel signals to produce as outputs a pair of channel signals in which the scanning line number sequences are respectively as shown for channel 1 and channel 2 in FIG. 10(c), described hereinabove, with the data contents being as indicated for A and B in FIG. 12(b) (during one recording scan) and as indicated for A' and B' (during the succeeding recording scan).

These channel signals from frame memory 31 are converted to analog form by D/A converters 32 and 33, and the analog signals produced thereby are respectively supplied to FM modulator circuits 34 and 35 to produce corresponding recording signals. These are supplied through respective recording amplifiers 36 and 37, recording/playback changeover switch 38, and head changeover switch 39 to 2, 2' during one recording scan, and heads 3, 3' during the succeeding scan.

During playback, the playback signals from the heads 2, 2', 3, 3' are transferred through playback amplifiers 40 and 42, FM demodulators 43, 44, and A/D converters 45, 46 to a second frame memory 47. A pair of channel signals is thereby produced from frame memory 47 in which the original line number sequences of the channel signals from multiplexer 27 (described above) are restored. The resultant output channel signals from frame memory 47 are applied to a demultiplexer circuit 48, in which the chrominance signal components are separated and are produced as a single channel signal which is applied to a chrominance signal interpolation circuit 50. Circuit 50 functions to restore the time sequences of successive portions of the chrominance signals Cw, Cn to those of the original input signals, and to produce respective time-compressed Cw and Cn output channel signals supplied to respective time-axis expansion circuits 51 and 52. These restore the correct time durations for the successive portions of signals Cw and Cn, and the resultant output signals from circuits 51 and 52 are applied to D/A converters 54 and 55 respectively. Demultiplexer 48 produces the time-expanded playback luminance signal component as two channel signals which are applied to a time-axis compression 49. Time-axis compression is thereby applied to restore the original luminance signal component in digital signal form which is applied to a D/A converter 53.

In the latter embodiment, the time-compressed chrominance signal components are combined into a single channel signal before multiplexing with the luminance signal component of the video signal. However it would be equally possible to arrange to directly multiplex the two time-compressed chrominance signal channels with the time-expanded luminance signal.

In general, as stated above, this embodiment is applicable to division of the input video signal into K channels with the drum rotational speed of N times the normal speed. Head changeover switching must in this case be executed (N - 1) times during each frame. However this problem can be overcome by performing blanking from a time immediately prior to each switching operation up to a time immediately following the switching operation, by applying time shift processing. TBC (Time Base Corrector) processing can be executed during playback to eliminate the effects of the blanking intervals.

Figure 15:
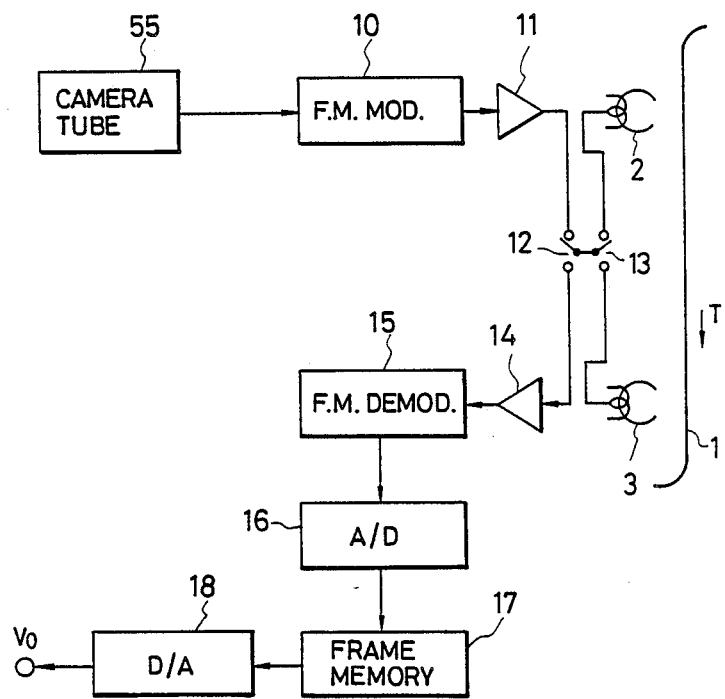
FIG. 15 is a general block circuit diagram of a VTR apparatus according to a third embodiment of the present invention.
Figure 16B:
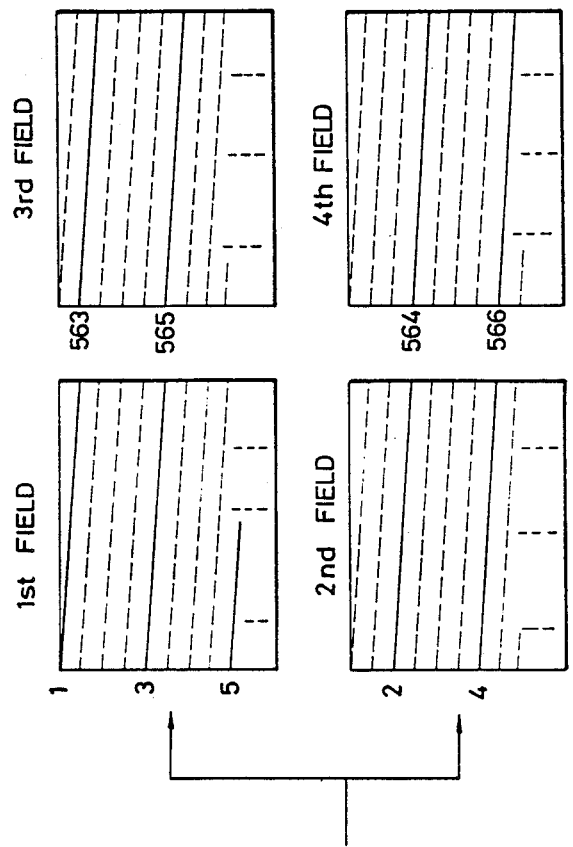
FIGS. 16(a) and 16(b) are diagrams for assistance in describing a field scanning sequence executed by the embodiment of FIG. 15.
Figure 16A:
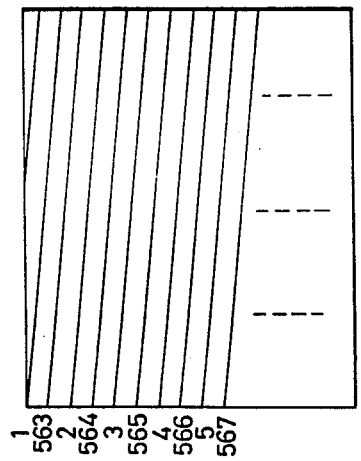

A third embodiment of the present invention will be described referring to FIGS. 15 and 16. This embodiment performs recording of a video signal having approximately twice the bandwidth of the NTSC standard. The playback signal produced by the apparatus has 1125 horizontal scanning lines per frame, a field frequency of 60 Hz, and 2:1 interlace. However in this embodiment, the signal to be recorded is produced by a special television camera in which scanning with 4:1 interlace is executed. The video signal from the camera is recorded by a rotary 2-head helical scan VTR having a head drum which rotates at 60 revolutions/second. FIG. 14 is a general block circuit diagram of this embodiment. Numeral 23 denotes the picture tube (or photoreceptor element array) of a television camera which produces an output video signal. This signal is applied to an FM modulator 10, whose output is coupled to a recording amplifier 11. Numeral 12 denotes a record/playback changeover switch, 13 is a head changeover switch, 2 and 3 are record/playback heads, 14 denotes a playback amplifier, 15 an FM demodulator, 16 an A/D converter, 17 a frame memory, and 18 a D/A converter. The video signal from camera tube 23 is modulated in FM modulator 10, and the resultant modulated signal is amplified by recording amplifier 11 and transferred through switches 12 and 13 to the heads 2 and 3 to be recorded on magnetic tape 1.

FIG. 15(a) illustrates the prior art manner in which camera tube 23 is scanned. 2:1 interlace scanning is performed with the entire target plate of the tube being scanned once in every 1/60 second. This is done by first sequentially scanning the lines numbered 1, 2, 3, . . . . . . during the 1/60 second interval of one field, then scanning lines 563, 564, 565, . . . . . during the next 1/60 second interval. The scanning method employed with the camera tube of the third embodiment of the present invention is shown in FIG. 15(b). The field repetition frequency is 120 Hz, with 4:1 interlace scanning. The scanning operation is shown separately for each of the four successive fields of one frame. During the first field, the odd-numbered lines 1, 3, 5, . . . are scanned. During second field, the even-numbered lines 2, 4, 6, . . . are scanned, to complete scanning of the first half of the frame. During a third field, lines 563, 565, 567, . . . . are scanned, and during the fourth field the lines 564, 566, 568, . . . are scanned to complete scanning of the second half of the frame.

During recording operation, since the head drum is rotated at 60 revolutions/second, each of the fields shown in FIG. 15(b) will be recorded on a corresponding one of the tracks of magnetic tape 1. Each track will have a recording format which is identical to that shown in FIG. 6(c). Since the recording format is identical to that of the first embodiment, the circuit blocks shown in FIG. 14 which process the playback video signal can be identical to the corresponding circuit blocks shown in FIG. 7(a) and described hereinabove with reference to the first embodiment of the present invention.

The third embodiment is especially applicable to a portable apparatus consisting of a video camera which is integrally combined with a VTR. Due to the fact that the head drum is rotated at 60 revolutions/second and that 4:1 interlace scanning of the target plate of the camera tube is performed, it is not necessary to provide an A/D converter, D/A converter or frame memory in order to process the video signal from the camera prior to recording. For this reason, and also since this embodiment enables varied-speed playback to be easily implemented (as described hereinabove for the first embodiment), the embodiment is highly suitable for a portable camera/VCR combination which can be made compact and light in weight, and can be manufactured at low cost. It should be noted that a conventional scanning circuit for a video camera can b easily modified to provide the 4:1 interlace scanning which is required for this embodiment.

It can be understood from the above that with the third embodiment of the present invention, recording is performed with each field of the video signal produced from a television camera being recorded by being divided between a plurality of tracks on the tape, and that the embodiment enables a recording format to be utilized which permits varied-speed playback operation, while enabling the need for an A/D converter, D/A converter and frame memory to process the video signal for recording to be eliminated, the elimination of these components being enabled by suitably determining the interlace ratio by which scanning of the video camera target is executed.

Although the above embodiments have been described with reference to recording and playback of high-definition television signals, the present invention is equally applicable to other types of video signal. In addition, multiplexing of the luminance and chrominance components of the video signal can be performed by various different methods, including the TCI method, the composite signal method, the component signal method, etc.

Although the method and apparatus of the present invention have been described in the above with reference to specific embodiments, it is possible to envision various changes and modifications to these embodiments which fall within the scope of the invention as set out in the appended claims. The above specification should therefore be understood in a descriptive and not in a limiting sense.

What is claimed is:

1. A method of recording a field interlace input video signal having two fields per frame and a frame period of Tf, each of said fields having a fixed number of horizontal scanning lines, the method comprising steps of:
   (a) performing time-axis expansion of said input video signal in units of horizontal scanning lines by substantially K times, where K is an integer which is greater than one, and dividing a resulting time-expanded video signal into K channel signals;
   (b) producing K channel recording signals by converting each field of said K channel signals to N successive mutually different sets of said scanning lines, where N is an integer which is greater than one, with said N sets being respectively produced during successive intervals each of duration Tf/2N, and with respective scanning lines of said sets being selected to mutually interlace over substantially the entirety of said each field; and
   (c) recording said recording channel signals in parallel on a magnetic tape, whereby K sets of said N sets of scanning lines are recorded in parallel on K corresponding tracks of said tape by each of successive recording scans across said tape.

2. A method of recording a 2:1 interlace video signal having two fields per frame and a frame period Tf, each said field comprising a fixed number of scanning lines, said video signal comprising a combination of a luminance signal and two chrominance signals, the method comprising steps of:
   (a) performing time-axis expansion of said luminance signal in units of said scanning lines to obtain a time-expanded luminance signal;
   (b) arranging successive portions each of said chrominance signals in a line-ordered sequence in accordance with corresponding ones of said scanning lines;
   (c) performing time-axis compression of said sequentially arranged chrominance signal portions to produce time-compressed chrominance signals;
   (d) executing time-axis multiplexing of said time-compressed chrominance signals with said time-expanded luminance signal and dividing a resultant multiplexed video signal into two channel signals;
   (e) producing two channel recording signals by converting each field of each of said channel signals to N successive sets of scanning lines, where N is an integer which is greater than one and all of said sets are mutually different, with said N sets being produced during successive intervals each of duration Tf/2N and with respective scanning lines of said sets being selected to mutually interlace over substantially the entirety of said each field; and
   (f) recording said recording channel signals in parallel on a magnetic tape by recording successive pairs of said N sets of scanning lines in parallel on respective pairs of diagonal tracks of said tape during respective recording scans across said magnetic tape.

3. A recording method according to claim 2, in which mutually corresponding portions of a first one of said two chrominance signals are respectively recorded on mutually adjacent ones of said recording tracks at mutually adjacent positions, and in which mutually corresponding portions of a second one of said two chrominance signals are respectively recorded on mutually adjacent ones of said recording tracks at mutually adjacent positions.

4. A method of using a plurality of rotating magnetic heads for recording on a magnetic tape a field interlace input video signal having two fields per frame and a frame period of Tf, each of said fields having a fixed number of horizontal scanning lines, the method comprising steps of:
   (a) producing a recording signal by converting each field of said input video signal to N mutually interlacing successive sets of said scanning lines by allocating each individual successive scanning line, of each group of N sequential scanning lines of said each field, to a respective one of said N interlacing sets, such that the scanning lines within each of said N sets occur in an order which is identical to an order in which said scanning lines occur within said each field, where N is an integer which is greater than one, said N sets being produced during successive intervals each of duration Tf/2N; and
   (b) recording said recording signal on a magnetic tape by sequentially recording said N sets of scanning lines on respective diagonal tracks of said tape by respective recording scans across said tape by said magnetic heads, such that each track has recorded at an initial portion thereof information representing a top portion of a picture expressed by said each field and has recorded at an end portion thereof information representing a bottom portion of said picture;
   whereby head switching operations for selectively supplying said recording signal to said magnetic heads occur during times at which said top portion and bottom portion are being recorded.

5. The method of claim 4 wherein said N interlacing sets of scanning lines define substantially coextensive subfields, extending substantially from said top portion of the picture to the bottom portion of the picture.

6. The method of claim 5 wherein successive subfields K and K+1 of said each field, respectively having scanning lines K, K+N, ..., K+M−N and K+1, K+1+N, ..., K+1+N−N of said each field, are recorded on successive ones of said tracks.

7. The method of claim 4 wherein each one of said respective tracks has recorded thereon a Kth subfield of said each field, $1 \leq K \leq N$, said Kth subfield comprising a Kth one of said N interlacing sets of scanning lines.

8. The method of claim 7 wherein said each track has recorded thereon a subfield having N scanning lines, a first scanning line of said subfield recorded at said initial portion of said each track being at most a Kth horizontal scanning line after a vertical blanking interval preceding said each field and a last scanning line of said subfield recorded at said end portion of said each track being at most a (N−K+1)th scanning line from a vertical blanking interval following said each field.

9. The method of claim 8 wherein said each field includes M scanning lines, and successive scanning lines of said subfield recorded on said each track are scanning lines j and j+N of said each field, $1 \leq j \leq M−N$.

10. A video signal recording and playback apparatus for recording a 2:1 interlace input video signal having two fields per frame, each said field comprising a set of horizontal scanning lines occurring in a fixed sequence, the apparatus comprising:
first analog to digital conversion means for converting said input video signal to a digital video signal;
first memory means and first memory control means for controlling said first memory means to store successive scanning lines of each field of said digital video signal and to produce a recording signal by successively reading out from said first memory means N successive mutually different sets of said scanning lines of said field, where N is an integer which is greater than one, with each of said N sets containing substantially 1/N of the scanning lines of said each field, and with respective scanning lines of said N sets being selected to mutually interlace over substantially the entirety of said each field;
first digital to analog conversion means for converting said recording signal to an analog recording signal, and FM conversion means for converting said analog recording signal to a frequency modulated signal;
recording and playback means for recording said frequency modulated signal on successive diagonal tracks of a magnetic tape by recording successive ones of said N sets of scanning lines on respective diagonal recording tracks of said tape by respective recording scans across said tape, and for playback from said tape;
FM demodulation means for demodulating a frequency modulated playback signal produced by playback of said magnetic tape, to obtain an analog video signal;
second analog to digital conversion means for converting said playback signal to a digital playback signal;
second memory means and second memory control means for temporarily storing said digital playback signal as data in said second memory means, and for thereafter reading out from said second memory means as an output signal the contents of said digital playback signal arranged in said sequence of scanning lines of the input video signal; and
second digital to analog conversion means for converting said output signal from said second memory means to an analog video signal.

11. A video signal recording and playback apparatus for recording a 2:1 interlace input video signal having two fields per frame, each said field comprising a set of horizontal scanning lines occurring in a fixed sequence, the apparatus comprising;
first analog to digital conversion means for converting said input video signal to a digital video signal;
means for performing time-axis expansion of said digital video signal in units of horizontal scanning lines by substantially K times, where K is an integer greater than one, and dividing a resulting time expanded video signal into K channels signals;
first memory means and first memory control means for controlling said first memory means to store successive scanning lines of each field of said K channel signals and thereafter read out said scanning lines to produce K channel recording signals by converting each field of said channel signals to N successive mutually different sets of said scanning lines, where N is an integer which is greater than one, with each of said N sets comprising 1/KN of the scanning lines in said each field, and with respective scanning lines of said N sets being selected to mutually interlace over substantially the entirety of said each field;
first digital to analog conversion means for converting said channel recording signals to respective K channels of analog recording signals, and FM conversion means for converting said analog recording signal to respective K channels of frequency modulated signals;
recording and playback means for recording said frequency modulated signals channels in parallel on successive sets of K diagonal tracks of a magnetic tape and playback therefrom, whereby K sets of said N scanning line sets are recorded during a single recording scan across said tape, and for playback from said tape;
FM demodulation means for demodulating K channels of frequency modulated playback signals produced by playback of said magnetic tape, to obtain K channels of analog video signal;
second analog to digital conversion means for converting said analog playback signals to K channels of digital playback signals;
second memory means and second memory control means for temporarily storing said digital playback signals as data in said second memory means, and for thereafter reading out said data to produce K channels of digital playback signals having scanning lines sequences respectively corresponding to scanning line sequences of said K channel signals produced by said time axis expansion means;
time axis compression means for executing time axis compression of said digital playback signals in units of scanning lines and combining resultant time compressed channel signals to produce a single channel digital video signal having a scanning line sequence identical to that of said input video signal; and
second digital to analog conversion means for converting said single channel digital video signal to an analog video signal.

* * * * *